(12) United States Patent
Dobrev et al.

(10) Patent No.: US 11,009,598 B2
(45) Date of Patent: May 18, 2021

(54) RADAR METHOD AND SYSTEM FOR DETERMINING THE ANGULAR POSITION, THE LOCATION, AND/OR THE VELOCITY OF A TARGET

(71) Applicant: Symeo GmbH, Neubiberg (DE)

(72) Inventors: Yassen Dobrev, Nuremberg (DE); Peter Gulden, Erding (DE); Mark Christmann, Munich (DE); Martin Vossiek, Fürth (DE); Michael Gottinger, Buckendorf (DE)

(73) Assignee: Symeo GmbH, Neubiberg (DE)

( * ) Notice: Subject to any disclaimer, the term of this patent is extended or adjusted under 35 U.S.C. 154(b) by 217 days.

(21) Appl. No.: 16/156,474

(22) Filed: Oct. 10, 2018

(65) Prior Publication Data
US 2019/0107614 A1 Apr. 11, 2019

(30) Foreign Application Priority Data

Oct. 11, 2017 (DE) ...................... 10 2017 123 636.8
Jan. 12, 2018 (DE) ...................... 10 2018 100 632.2

(51) Int. Cl.
*G01S 13/58* (2006.01)
*G01S 13/87* (2006.01)
*G01S 7/35* (2006.01)
*G01S 13/931* (2020.01)
*G01S 13/00* (2006.01)

(52) U.S. Cl.
CPC ............ *G01S 13/589* (2013.01); *G01S 7/352* (2013.01); *G01S 13/87* (2013.01); *G01S 13/878* (2013.01);
(Continued)

(58) Field of Classification Search
CPC ...................................................... G01S 7/003
See application file for complete search history.

(56) References Cited

U.S. PATENT DOCUMENTS 3,264,644 A * 8/1966 Jacob ...................... G01S 13/86
                                                                342/103
3,290,677 A * 12/1966 Jacob ...................... G01S 13/86
                                                                342/23
(Continued)

FOREIGN PATENT DOCUMENTS

DE    102014104273        10/2015
EP          2602636 A1 *  6/2013    ............. G01S 13/82
(Continued)

OTHER PUBLICATIONS

Doerry, Armin W., et al., "Tangential Velocity Measurement using Interferometric MTI Radar", Sandia Report SAND2002-3614, [Online]. Available: http://prod.sandia.gov/techlib/access-control.cgi/2002/023614.pdf. [Accessed Sep. 26, 2017], (Nov. 2002), 26 pgs.
(Continued)

*Primary Examiner* — Bernarr E Gregory
(74) *Attorney, Agent, or Firm* — Schwegman Lundberg & Woessner, P.A.

(57) ABSTRACT

The invention relates to a radar method for determining the angular position, the location, and/or the velocity, in particular the vectorial velocity, of a target, wherein a first transceiver unit and at least one second transceiver unit, which is spatially separated in particular from the first transceiver unit, are not synchronized, but a measurement beginning of the first transceiver unit and the second transceiver unit is triggered in a wireless or wired manner with a chronological deviation $\Delta t_n$, wherein measurements of the transceiver units are coherently processed.

22 Claims, 5 Drawing Sheets

(52) U.S. Cl.
CPC ....... *G01S 13/931* (2013.01); *G01S 2007/356* (2013.01)

(56) References Cited

U.S. PATENT DOCUMENTS

| | | | | |
|---|---|---|---|---|
| 3,795,911 | A * | 3/1974 | Hammack | G01S 13/87 342/106 |
| 4,151,525 | A * | 4/1979 | Strauch | G01S 13/82 342/139 |
| 4,347,513 | A * | 8/1982 | Schindler | G01S 7/003 342/13 |
| 5,867,489 | A * | 2/1999 | Hershey | H04B 7/2125 370/324 |
| 6,982,668 | B1 | 1/2006 | Doerry et al. | |
| 7,884,754 | B1 * | 2/2011 | Alouani | G01S 13/87 342/95 |
| 2010/0045508 | A1 * | 2/2010 | Ekbal | G01S 13/765 342/145 |
| 2010/0167662 | A1 * | 7/2010 | Kluge | G01S 13/84 455/67.16 |
| 2010/0277360 | A1 * | 11/2010 | Lee | G01S 13/84 342/125 |
| 2010/0321235 | A1 * | 12/2010 | Vossiek | G01S 13/9089 342/25 A |
| 2017/0176583 | A1 | 6/2017 | Gulden et al. | |

FOREIGN PATENT DOCUMENTS

| | | | | |
|---|---|---|---|---|
| GB | 2062395 | A * | 5/1981 | ........... G01S 13/788 |
| GB | 2315943 | A * | 2/1998 | ............. G01S 13/84 |
| WO | WO-2017118621 | | 7/2017 | |

OTHER PUBLICATIONS

Kellner, Dominik, et al., "Instantaneous Lateral Velocity Estimation of a Vehicle using Doppler Radar", Information Fusion (FUSION), 2013 16th International Conference on, 2013, pp. 877-884, (2013), 877-884.

Nanzer, Jeffrey A., "Resolution of interferometric angular velocity measurements", 2011 IEEE International Symposium on Antennas and Propogation (APSURSI), (2011), 3229-3232.

"German Application Serial No. 102018100632.2, Search Report dated Jul. 25, 2018", (w/ English Summary), 12 pgs.

Doerry, A. W., "Patch Diameter Limitation due to High Chirp Rates in Focused SAR Images", *IEEE Transactions on Aerospace and Electronic Systems*, 30(4), (Oct. 1994), 1125-1129.

Montlouis, Webert, et al., "Direction of Arrival and Angular Velocities (DOAV) Estimation using Minimum Variance Beamforming", *2007 IEEE Radar Conference*, Apr. 17-20, 2007, Boston, MA (USA), (2007), 641-646.

Nanzer, Jeffrey A., et al., "A 29.5 Ghz Radar Interferometer for Measuring the Angular Velocity of Moving Objects", *2013 IEEE MTT-S International Microwave Symposium Digest (IMS)*, (Jun. 2013), 3 pgs.

Nanzer, Jeffrey A., et al., "Correction of Frequency Uncertainty in Wide Field of View Interferometric Angular Velocity Measurements", *2012 IEEE/MTT-S International Microwave Symposium Digest*, (2012), 3 pgs.

Nanzer, Jeffrey A., "Micro-Motion Signatures in Radar Angular Velocity Measurements", *2016 IEEE Radar Conference (RadarConf)*, (2016), 1-4.

Nanzer, Jeffrey A., "Millimeter-Wave Interferometric Angular Velocity Detection", *IEEE Transactions on Microwave Theory and Techniques*, 58(12), (Dec. 2010), 4128-4136.

Rohling, Hermann, et al., "Lateral Velocity Estimation for Automotive Radar Applications", *2007 IET International Conference on Radar Systems*, Edinburgh, UK, Oct. 15-18, 2007, (2007), 4 pgs.

Wagner, Thomas, et al., "Wide-Band Range-Doppler Processing for FMCW Systems", *Proceedings of the 10th European Radar Conference*, Nuremberg, Germany, (2013), 160-163.

* cited by examiner

RADAR METHOD AND SYSTEM FOR DETERMINING THE ANGULAR POSITION, THE LOCATION, AND/OR THE VELOCITY OF A TARGET

CLAIM OF PRIORITY

This application claims the benefit of priority to German Application No. 10 2017 123 636.8, filed 11 Oct. 2017, and German Application No. 10 2018 100 632.2, filed 12 Jan. 2018, which applications are incorporated by reference as if reproduced herein and made a part hereof in their entirety, and the benefit of priority of each of which is claimed herein.

FIELD OF THE DISCLOSURE

This document pertains generally to radar systems.

BACKGROUND

Known radar methods, in particular for estimating a vectorial velocity (cf. [1]-[3]), use distributed radar devices, which measure a Doppler velocity in relation to an object (target) individually and independently of one another. The Doppler velocity can be interpreted as the projection of the vectorial velocity on a connecting vector between the radar and the target. If the positions of the radars and the target are known and/or can be determined, the vectorial velocity can then be determined from the individual projections by solving the linear equation system. However, the accuracy of this method is strongly dependent on the geometrical distribution of the stations in relation to the target ("dilution of precision").

A further possibility for a radar measurement, in particular for determining the vectorial velocity, consists of the analysis of the phase curve differences between two antennas (cf. [4]-[11]). This method enables higher accuracies and is less dependent on the problem geometry. However, the prior art according to [4]-[7] only relates to the case in which the target is located at 0° azimuth (boresight) and in the array far field. Documents [8]-[11] also relate to the case azimuth≠0°, but not the array near field. The methods of the prior art according to [4]-[11], which are based on phase curve differences, use two antennas which are connected to a radar device.

Since comparatively large apertures are necessary for the accurate measurement of the tangential velocity, the case in which the target is not located at 0° azimuth and/or in the near field is of great interest.

[1] D. Kellner, M. Barjenbruch, K. Dietmayer, J. Klappstein, and J. Dickmann, "Instantaneous lateral velocity estimation of a vehicle using doppler radar," In *Information Fusion (FUSION)*, 2013 16th International Conference on, 2013, pp. 877-884.

[2] H. Rohling, F. Folster, and H. Ritter, "Lateral velocity estimation for automotive radar applications," In 2007 *IET Int. Conf. on Radar Systems*, Edinburgh, UK, 2007, pp. 181-181.

[3] W. Montlouis and P.-R. J. Comely, "Direction of Arrival and Angular Velocities (DOAV) Estimation using Minimum Variance Beamforming," in *Radar Conference*, 2007 *IEEE*, 2007, pp. 641-646.

[4] A. W. Doerry, "Patch diameter limitation due to high chirp rates in focused SAR Images," *IEEE transactions on aerospace and electronic systems*, vol. 30, no. 4, pp. 1125-1129, 1994.

[5] A. Doerry, "Tangential Velocity Measurement using Interferometric MTI Radar," 2002. [Online]. Available: http://prod.sandia.gov/techlib/access-control.cgi/2002/023614.pdf. [Accessed Sep. 26, 2017]

[6] A. Doerry, B. Mileshosky, and D. Bickel, "Tangential velocity measurement using interferometric MTI radar," U.S. Pat. No. 6,982,668 B1, Jan. 3, 2006.

[7] J. A. Nanzer, "Millimeter-Wave Interferometric Angular Velocity Detection," *IEEE Transactions on Microwave Theory and Techniques*, December 2010.

[8] J. A. Nanzer and A. H. Zal, "Correction of frequency uncertainty in wide field of view Interferometric angular velocity measurements," in *Microwave Symposium Digest (MTT), 2012 IEEE MTT-S International*, 2012, pp. 1-3.

[9] J. A. Nanzer, K. Kammerman, and K. S. Zilevu, "A 29.5 GHz radar interferometer for measuring the angular velocity of moving objects," in *Microwave Symposium Digest (IMS), 2013 IEEE MTT-S International*, 2013, pp. 1-3.

[10] J. A. Nanzer, "Resolution of interferometric angular velocity measurements," in *Antennas and Propagation (APSURSI), 2011 IEEE International Symposium on*, 2011, pp. 3229-3232.

[11] J. A. Nanzer, "Micro-motion signatures in radar angular velocity measurements," in *Radar Conference (RadarConf)*, 2016 *IEEE*, 2016, pp. 1-4.

[12] T. Wagner, R. Feger, and A. Stelzer, "Wide-band range-Doppler processing for FMCW systems," in *Radar Conference (EuRAD)*, 2013 European, 2013, pp. 160-163.

SUMMARY OF THE DISCLOSURE

The present invention relates to a radar method and system for determining the angular position, the location, and/or the velocity, in particular the vectorial velocity, of a target.

It is the object of the invention to determine an angular position, a location, and/or a velocity, in particular a vectorial velocity, of a target with comparatively high accuracy in the simplest possible manner.

In particular, the object is achieved by a radar method for determining an angular position, a location, and/or a velocity, in particular a vectorial velocity, of a target, wherein a first transceiver unit (=sending and receiving unit) and at least one second transceiver unit (in particular spatially separated from the first transceiver unit) are not synchronized, but a measurement beginning of the first transceiver unit and the second transceiver unit is triggered (in a wireless or wired manner) with a chronological deviation (trigger offset time) $\Delta t_n$. Measurements of the measuring receiving units are preferably coherently processed.

The second transceiver unit is in particular considered to be non-synchronized in relation to the first transceiver unit if a chronological deviation (trigger offset time) between first and second transceiver units is greater than 1 ps, preferably greater than 1 ns, possibly greater than 10 ns. The chronological deviation can also be, however ≤10 μs, preferably ≤1 μs (in particular in the case of a dynamic target). In particular in the case of a stationary target, the chronological deviation $\Delta t_n$ can also be greater. Coherent processing is to be understood in particular to mean that the measurements of the transceiver units are further processed as if they had been generated by a common local oscillator. One example of this would be two receiving antennas of an SIMO radar.

A target can thus be acquired in a simple manner, in particular an angular position, a location, and/or a velocity, in particular a vectorial velocity, of the target can be determined. In particular, the present invention enables a simple and accurate estimation (determination) of the vectorial velocity even in the case of an azimuth≠0° and/or in the near field. Furthermore, the use of coarsely-synchronized distributed radar stations for generating larger apertures is possible.

A chronological deviation (trigger offset time) $\Delta t_n$ is to be understood in particular as a deviation which results because of the method and/or system, in particular as a result of wireless and/or wired transmissions which are used. The chronological deviation $\Delta t_n$ is thus in particular inherent in the method and/or system. The measurements (and/or transmission signals) of the transceiver units are preferably not generated by a common local oscillator.

At least two measurement signals (which were reflected from a common target) are preferably interfered with one another, in particular by complex-conjugated multiplication, in particular in the time range (=nonexclusive alternative a)). It is to be noted in this case that the complex-conjugated multiplication can correspond to a division by a complex pointer having normalized amplitude.

Alternatively or additionally, compressed signals, in particular range-Doppler-compressed signals can be interfered with one another, preferably by folding, in particular in the frequency range (=nonexclusive alternative b)).

A holography processing preferably takes place in the xy direction. An interference preferably takes place along a Doppler direction, for example, by multiplication in the time range (alternative a)) or by folding in the frequency range (alternative b)). The holography can be provided both in a) and also in b), as the foundation for the interference.

In particular (alternatively or additionally) at least two signals can be holographically interfered, first spatially, for example, in a Cartesian x, y coordinate system, and then in the Doppler plane (velocity plane) by multiplication in the time range (alternative a), in particular by conjugated complex multiplication, or by folding in the frequency range (alternative b).

A vectorial velocity of the target is preferably determined from a resulting signal.

In principle, the method is particularly preferably configured such that a (2D or 3D) vectorial velocity of the target can be determined.

Preferably, the first and/or second transceiver unit determines its/their own (vectorial) velocity based on the (vectorial) velocity of one or more target(s) with known (vectorial) velocity, e.g. stationary targets (ego-motion estimation).

In a first alternative, the target can be located in the near field. Alternatively, the target can also be located in the far field. Near field is preferably to be understood as a distance of the target which is less than or equal to 10 times a distance between the two transceiver units (or, in the case of multiple transceiver units, a distance between the two transceiver units which are the farthest away from one another), and/or is less than or equal to 10 times an aperture size of a system made of transceiver units. A far field is to be understood in particular as a distance to the target which is greater than the just-mentioned relative values. The target is particularly preferably located in the near field. In particular in the near field, precise measurements can be achieved in a simple manner (in contrast to the prior art).

In one specific embodiment, the transceiver units form a distributed aperture. A distance between multiple transceiver units can be at least 20 cm, more preferably at least 50 cm, more preferably at least 100 cm (in the case of multiple transceiver units, this can apply either to a distance to the respective closest transceiver unit or alternatively to the distance between the two transceiver units which have the greatest distance in relation to one another among all pairs of possible transceiver units).

Locating of the target preferably takes place according to a holography principle.

In specific embodiments, the method is an FMCW radar method (wherein FMCW stands for frequency modulated continuous wave).

The method preferably operates according to the range-Doppler principle.

In specific embodiments, the at least two transceiver units are monostatic. A distance between the transceiver units is preferably at least 5 times, more preferably at least 10 times as large as a respective distance between transmitting and receiving antennas of the same transceiver unit (also referred to hereafter as the Rx antenna=receiving antenna and Tx antenna=transmitting antenna, respectively).

In particular, a Fourier transform is performed along a slow time after a holographic interference. The "slow time" is defined in greater detail hereafter. A peak search can be carried out to determine an ellipse/hyperbola velocity, in particular in multiple or all pixels (of the target). Furthermore, a determination of ellipse/hyperbola parameters can be carried out, in particular in multiple or all pixels (of the target). Alternatively or additionally, a transformation of an ellipse/hyperbola velocity into a (Cartesian) vectorial velocity can be carried out.

A signal frequency can be halved before an interference formation.

A Doppler velocity can be determined, in particular for at least partial compensation of a Doppler shift.

An optimum filter approach can be used, in particular for at least partial compensation of a Doppler shift and/or in the case of a comparatively high bandwidth of the radar and/or a comparatively high velocity of the target.

A range-Doppler compression can be carried out by means of a fractional Fourier transform (FRFT), in particular in the case of a comparatively high bandwidth of the radar and/or a comparatively high velocity of the target.

One or more of possibly (range-Doppler)-compressed signals can additionally be compressed in the azimuth direction, preferably by means of Fourier transform and/or digital beamforming algorithms, in particular for side lobe suppression.

Methods are proposed in embodiments, wherein at least three transceiver units are used, wherein preferably a 3D velocity determination is carried out, in particular by forming an intersection of two pairs, which each consist of an ellipsoid and a hyperboloid. Alternatively or additionally, an optimum filter approach can be used, wherein a hypothesis (or hypotheses) is/are formed for multiple or all [x, y, z, $v_x$, $v_y$, $v_z$] combinations in a search range and is/are compared to measurement data.

Methods are proposed according to embodiments, wherein
    in the first transceiver unit, a first signal is generated and transmitted, in particular emitted, via a path,
    in the second transceiver unit, a further first signal is generated and transmitted, in particular emitted, via the path,
    a first comparison signal is formed from the first signal of the first transceiver unit and from such a first signal from the second transceiver unit received via the path, and a further comparison signal is formed from the first signal of the second transceiver unit and from such a first signal from the first transceiver unit received via the path, wherein the further comparison signal is preferably transmitted, in particular communicated, from the second transceiver unit to the first transceiver unit, and/or wherein preferably a comparison-comparison signal is formed from the first comparison signal and the further comparison signal and/or wherein in a first step, deviations of the comparison signals which are induced by systematic deviations in the transceiver units are compensated for and, in a second step, at least one complex value from a first of the two comparison signals or from a signal which was derived from this first comparison signal is used for the purpose of adapting at least one complex value of the second of the two comparison signals or a value of a signal which was derived from this second comparison signal and thus to form an adapted signal, wherein the adaptation takes place such that the vectorial sum or the difference of the complex values is formed by a mathematical operation or the sum or the difference of the phases of the complex values is formed. Refinements of these methods (also referred to as method I and method II hereafter) can be inferred from DE 10 2014 104 273 A1 and/or WO 2017/018621 A1. The disclosure in this regard of DE 10 2014 104 273 A1 and/or WO 2017/018621 A1 is hereby explicitly part of the present invention by reference. A corresponding radar system is also described in DE 10 2014 104 273 A1. The method according to DE 10 2014 104 273 A1 is to be referred to hereafter as "method I". The configuration of the radar system according to DE 10 2014 104 273 A1 is to be referred to as "configuration I". A further method and a further configuration for a radar system to enhance the coherency can be inferred from WO 2017/118621 A1. The method or radar system described in these two applications is to be referred to hereafter as "method II" and "configuration II", respectively. The present method is preferably applied to a direct path and a crossed path according to the method I and/or II.

The above-mentioned object is furthermore achieved by a radar system for determining the angular position, the location, and/or the velocity, in particular the vectorial velocity, of a target, in particular for carrying out the above method, wherein a first transceiver unit and at least one second transceiver unit are provided, which are not synchronized with one another, wherein a control unit is provided, which is configured to trigger a measurement beginning of the first transceiver unit and the second transceiver unit with a chronological deviation (trigger offset time) $\Delta t_n$ in a wireless or wired manner, wherein a processing and/or analysis unit is provided, which is configured such that measurements of the transceiver units are processed coherently.

Insofar as computations, analyses, or other method steps are carried out (for example, in the (respective) transceiver unit), these also include a possibly physically independent analysis unit, which is connected to one or more transceiver units. A control unit, for example, for triggering a measurement beginning, can also be designed as a physically independent control unit (possibly in a common assembly, in particular housing, with the analysis unit), which is connected to one or more transceiver units. For example, the respective transceiver unit can be designed as an assembly of in particular one or more antennas having several (a few) signal-generating or signal-processing components, while further components, such as signal comparison units or a control and/or analysis unit, can be connected as structurally independent components to such an assembly. Insofar as components are used (if technically implementable), they can be formed as so-called hardware from processing components and/or can be implemented as signal or data processing steps executed entirely or partially in a processor.

In general, the control and/or analysis unit can be part of one or more transceiver units or can be connected to one or more such transceiver unit(s). A physically independent control and/or analysis unit can optionally be provided, which is connected to the respective transceiver unit or the remaining components of the respective transceiver unit, respectively. Alternatively, the control and/or analysis unit can possibly be integrated into the first and/or the second (general further) transceiver unit, for example, in a common housing and/or as a module.

Each transceiver unit can have one or more transmitting and/or receiving antennas.

The above-mentioned object is furthermore achieved by the use of the method of the above type and/or the system of the above type for a mobile device, preferably a vehicle, in particular a passenger automobile and/or utility vehicle.

The above-mentioned object is furthermore achieved by a mobile device, in particular a vehicle, preferably a passenger automobile and/or utility vehicle, comprising the above system.

BRIEF DESCRIPTION OF THE DRAWINGS

In the following description, further principles, aspects, and embodiments of the invention are described, also with reference to the appended figures. In the figures.

In the following description, the same reference signs are used for identical and identically-acting parts.

DETAILED DESCRIPTION

Coherent Processing of Distributed Radar Stations for Locating:

The phase of the transmitted signal $\varphi_{Tx}$ or received signal $\varphi_{Rx}$, respectively, of an FMCW radar which operates according to the range Doppler principle may generally be described as $$\varphi_{Tx}(t_f, t_i) = 2\pi\left(f_0 t_f + \frac{\mu t_f^2}{2}\right) + \varphi_0. \tag{1}$$

and $$\varphi_{Rx}(t_f, t_i) = 2\pi\left(f_0(t_f - \tau) + \frac{\mu(t_f - \tau)^2}{2}\right) + \varphi_0 + \varphi_t. \tag{2}$$

where:

$t_f=0 \ldots T=t-t_i$: "fast time"; T is a sweep duration, t is the absolute time.

$t_i=iT$: "slow time", $i=0 \ldots M$ is a sweep number, M is the number of ramps in a burst.

$$\tau = \frac{d_{rt}(t_f, t_i)}{c}:$$  (5)

"time-of-flight" from the Tx antenna to the target and back to the Rx antennas; $d_{rt}(t_f, t_i)$ is the associated distance (see (4)).

$f_0$: carrier frequency: $\mu=B/T$: sweep slope: B: bandwidth; c: propagation velocity.

$\varphi_0$: unknown starting phase of the sweep.

$\varphi_t$: reflection phase of the target.

The phase of the (baseband) signal, which results by mixing of the Rx signal (received signal) with the Tx signal (transmitted signal), is then $$\varphi(t_f, t_i) = \qquad (3)$$

$$\varphi_{Tx}(t_f, t_i) - \varphi_{Rx}(t_f, t_i) \overset{d_{rt}^2(t_f,t_i) \ll d_{rt}(t_f,t_i)t}{\approx} \frac{2\pi}{c}(f_0 + \mu t_f)d_{rt} + \varphi_t,$$

with the round-trip distance $$d_{rt}(t_f, t_i) \overset{d \gg |v_r|MT}{\approx} d_{rt,0} + 2v_r(t_f + t_i). \qquad (4)$$

In this case, $d_{rt,0}$ denotes the round-trip distance to the target at the beginning of a burst and $v_r$ denotes the radial velocity of the target in relation to the radar.

Inserting (4) into (3) while neglecting terms which contain $t_f^2, t_i^2$, and $t_f t_i$ results in $$\varphi(t_f, t_i) \approx \frac{2\pi}{c}(f_0 d_{rt,0} + (\mu d_{rt,0} + 2f_o v_r)t_f + 2f_0 v_r t_i) + \varphi_t. \qquad (5)$$

The resulting signal phase in (5) is only still dependent on the distance to the target, the relative radial velocity of the target, and the reflection phase of the target. The unknown starting phase $\varphi_0$ disappears during the mixing procedure in (3).

If one uses N distributed radar stations (transceiver units), the clocks of which are not frequency-synchronized, but are of the same type, in which the measurement start is triggered via wire or wirelessly simultaneously with an accuracy of $\Delta t_n$ and the ramps of which are offset with a frequency offset $\Delta f_n$ in relation to one another, the following signal model results for the baseband signal phase in the radar number n:

$$\varphi_n(t_f, t_i) \approx \qquad (6)$$
$$\frac{2\pi}{c}((f_0 + \Delta f_n)d_{rt,0,n} + (\mu d_{rt,0,n} + 2(f_o + \Delta f_n)v_{r,n})(t_f + \Delta t_n) + 2$$
$$(f_o + \Delta f_n)v_{r,n}(t_i + \Delta t_n)) + \varphi_t.$$

The individual phase terms have the following significance:

$$\varphi_{\phi,n} = \frac{2\pi}{c}f_0\left(1 + \frac{\Delta f_n}{f_0}\right)d_{rt,0,n} + \varphi_t \overset{\Delta f_n \ll f_0}{\approx} \frac{2\pi}{c}f_0 d_{rt,0,n} + \varphi_t:$$

Phase offset term, which is dependent on the path difference between the stations and can be used for angle estimation.

$$f_d = \frac{\partial \varphi_n(t_f, t_i)}{\partial t_f} \approx \frac{2\pi}{C}\mu d_{rt,0,n}:$$

Frequency, which is proportional to the distance. Results by way of compression (for example, with the aid of FFT) in "fast time" direction.

$$f_{v_r} = \frac{\partial \varphi_n(t_f, t_i)}{\partial t_i} \approx 2f_0\left(1 + \frac{\Delta f_n}{f_0}\right)v_{r,n} \overset{\Delta f_n \ll f_0}{\approx} 2f_0 v_{r,n}:$$

Frequency, which is proportional to the radial velocity. Results by way of compression (for example, with the aid of FFT) in "slow time" direction.

$\varphi_t$: phase term, which is approximately equal in each station n, presuming the reflection behavior of the target is identical in every direction illuminated by the radars.

Since the trigger offset time $\Delta t_n \approx 15$ ns (possibly 1 to 100 ns, in particular 5 to 30 ns) in the case of wired triggering and $\Delta t_n \approx 1$ µs (possibly 0.1 to 10 µs, in particular 0.5 to 2 µs) in the case of wired triggering, in generally $|v|\Delta t_n \approx 0$, i.e., the target position remains approximately constant during the time $\Delta t_n$.

$\varphi_{\varphi,n}$ is therefore only still dependent on the distance between the respective radar and the target and can be coherently processed in all stations. The radars form a distributed aperture.

The following applies for the signal $s_n$ in station n after a range compression (compression along the fast time $t_f$)

$$s_n(d, t_0) = W_d(d - d_{rt,0,n}) \cdot \exp\left(j\left(\frac{2\pi}{c}f_0 d_{rt,0,n} + \varphi_t\right)\right), \qquad (7)$$

where $W_d$ denotes the Fourier transform of the window function used in range. Proceeding from this signal model, 2D locating of the target can be carried out according to the holography principle with the aid of the following optimum filter:

$$h_n(d_{n,hyp}(x_{hyp}, y_{hyp})) = \exp\left(-j\frac{2\pi}{c}f_0 d_{n,hyp}(x_{hyp}, y_{hyp})\right), \qquad (8)$$

with the hypothesis for the round-trip distance $$d_{n,hyp}(x_{hyp}, y_{hyp}) = \|p_{Tx,n} - p_{t,hyp}\| + \|p_{t,hyp} - p_{Rx,n}\| \text{ with} \qquad (9)$$
$$p_{t,hyp} = [x_{hyp}, y_{hyp}].$$

$p_{Tx,n}$ or $p_{Rx,n}$ is the known 2D position of the Tx antenna or Rx antenna, respectively, of radar n. Each radar (transceiver unit) can have one or more Tx and/or Rx antennas. If more than 1 antenna is provided, a hypothesis has to be prepared for each Tx-Rx combination according to the same principle. $p_{t,hyp}$ is a hypothesis to be checked for the 2D position of the target. The method may be adapted directly to 3D if the coordinates in (9) are replaced with 3D coordinates.

The probability that a target is located at the position $p_{t,hyp}$ is then computed as follows:

$$I(x_{hyp}, y_{hyp}) = \sum_{n=1}^{R} h_n(d_{n,hyp}(x_{hyp}, y_{hyp})) \cdot s_n(d, t_0). \quad (10)$$

If the target is located in the far field of the aperture, (10) is reduced to the beamforming approach and the 2D search over x and y can be replaced by a 1D search for the distance and a subsequent search for the angle.

If the target is located in the near field of the aperture, a 2D search is preferably to be carried out according to (10). Since the goal can be located in the individual radars in various range bins ("range migration"), an interpolation in the range direction is possibly necessary, which can be implemented as a complex-value linear interpolation.

This method enables the coherent processing of nonsynchronized distributed radar stations, which enables the implementation of larger apertures. The localization of a target with a high accuracy is thus possible.

Figure 1:
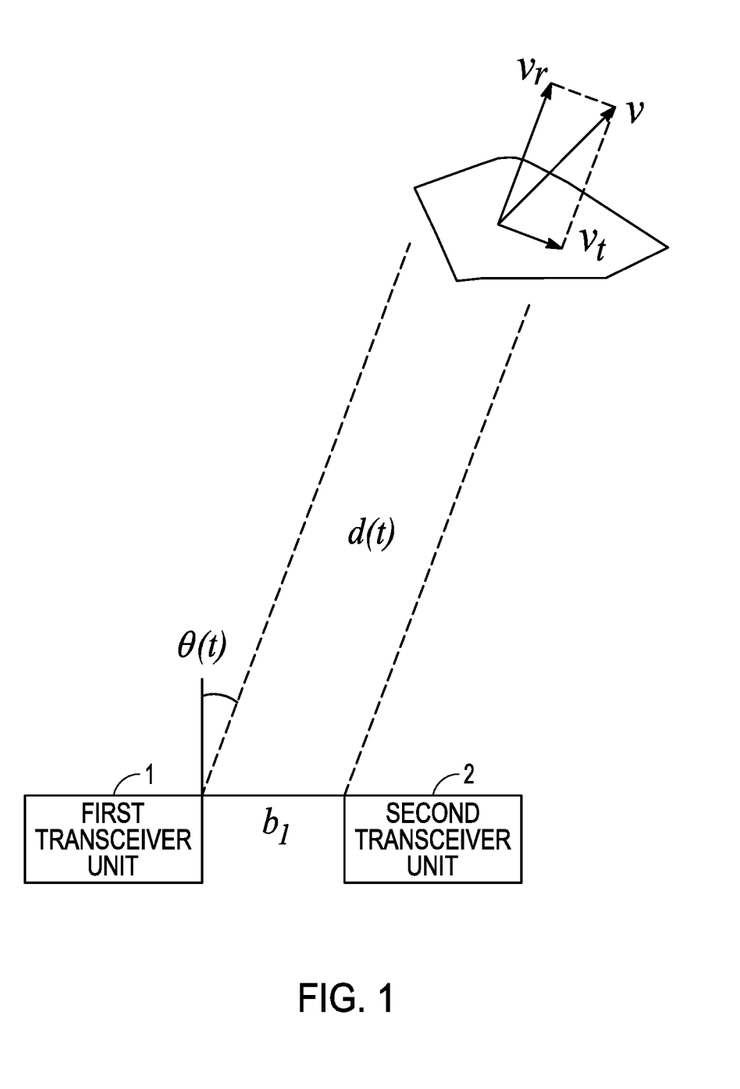
FIG. 1 shows two receiver units at a distance to one another.

Coherent Processing of Distributed Radar Stations to Determine the Vectorial Target Velocity in the Far Field FIG. 1 shows two transceiver units 1, 2 at a distance of $b_1$ in relation to one another, which measure in relation to the target, which moves at a vectorial velocity v, approximately simultaneously according to the FMCW range Doppler principle.

When a target is located in the far field of the antenna array, which comprises the transceiver units 1, 2 (and possibly further transceiver units), the geometry can be as illustrated in FIG. 1. The target is originally located at [$d_0$, $\theta_0$] in the radar polar coordinate system and moves at the vectorial velocity v. The distance change between the radars in the target (radial component) can be described as $$d(t) = d_0 + v_r t \quad (11)$$

with the radial velocity $v_r$. The angle change (tangential component) is $$\theta(t) = \theta_0 + \omega t = \theta_0 + \frac{v_t}{d_o} t, \quad (12)$$

where $\omega$ denotes the angular velocity and $v_t$ denotes the tangential velocity. The associated signal model in the transceiver units 1, 2, which operate according to the FMCW range Doppler principle, after a range compression (for example, with the aid of the Fourier transform), is $$s_1(d, t_i) = \delta_d(d - 2d_0) \cdot \exp\left(j\frac{2\pi}{\lambda}(2d_0 + 2v_r t_i)\right), \quad (13)$$

$$s_2(d, t_i) =$$

$$W_d(d - 2d_0) \cdot \exp\left(j\frac{2\pi}{\lambda}(2d_0 + 2v_r t_i + 2b_1 \sin(\theta_0 + \omega_a t_i))\right),$$

wherein $W_d$ denotes the Fourier transform of the window function used in range. In this case, $t_1$ denotes the starting time of the FMCW ramps ("slow time"). For the measured distances to the target in both radars, $d_1 \approx d_2 = d_0$ applies as a result of the far field approximation $d_0 \gg b_1$. The following results by interference of both signals $$s(d, t_i) = s_1^*(d, t_i) \cdot s_2(d, t_i) = \delta_d(d - 2d_0) \cdot \exp\left(j\frac{2\pi}{\lambda}b_1 \sin(\theta_0 + \omega_a t_i)\right), \quad (14)$$

wherein |•|* denotes the complex conjugation. With the approximation $\omega_a t_i \approx 0$ and by Taylor series expansion, (14) may be approximated as $$s(d, t_i) \approx W_d(d - 2d_0) \cdot \exp\left(j\frac{2\pi}{\lambda}(b_1 \sin(\theta_0) + b_1 \cos(\theta_0)\omega_a t_i)\right). \quad (15)$$

A subsequent Fourier transform along $t_i$ results in $$s(d, 2\pi f_a) = \mathcal{F}(s(d, t_i), t_i) \quad (16)$$

$$= W_d(d - 2d_0) \cdot W_{\omega_a}\left(2\pi f_a - \frac{2\pi}{\lambda}b_i \cos(\theta_0)\omega_a\right) \cdot$$

$$\exp\left(j\frac{2\pi}{\lambda}b_i \sin(\theta_0)\right).$$

In this case, $f_a$ denotes the resulting signal frequency in the image region (azimuth direction). The angular velocity $\omega_a$/tangential velocity $v_t$ then result as $$v_t = \omega_a d_0 = \frac{\lambda d_0}{b_1 \cos(\theta_0)} f_{a,max}, \quad (17)$$

wherein $f_{a,max}$ denotes the position of the maximum in the 2D spectrum $s(d, 2\pi f_a)$ along the $f_a$ direction (azimuth direction in the image region).

The interference similar to (14) can also be applied to range-Doppler-compressed data. The multiplication in (14) then has to be replaced by folding. The complete velocity vector may be determined by the estimation of $v_r$ with the aid of the standard range Doppler method and the tangential velocity $v_t$ from (17) orthogonal thereto. This presumes the knowledge of the angle in relation to the target $\theta_0$. This may be determined, for example, using known angle estimation techniques (beamforming).

Resolution and Uniqueness Range

The resolution of the tangential velocity estimation for a rectangular window may be computed by replacing $f_a = 1/NT$ in (17) with $$\Delta v_t = \frac{\lambda d_0}{b_1 \cos(\theta_0) NT}. \quad (18)$$

(The resolution is ≈2 times less for Hann windowing.)

By inserting $$f_a = \frac{f_{sampling}}{2} = \frac{1}{2T} \text{ in}, \quad (17)$$

$$v_{t,max} = \pm \frac{\lambda d_0}{b_1 \cos(\theta_0) 2T}. \quad (19)$$

is obtained for the uniqueness range.

Both resolution and also uniqueness range are therefore dependent on the distance and angle in relation to the target. An enlargement of the aperture $b_1$ results in an improvement of the resolution and reduction of the uniqueness range. If further receiving units are provided between the existing two, this results in an enlargement of the uniqueness range.

General Solution for the Coherent Processing of Distributed Radar Stations to Determine the Vectorial Target Velocity (Also in the Near Field)

Figure 2:
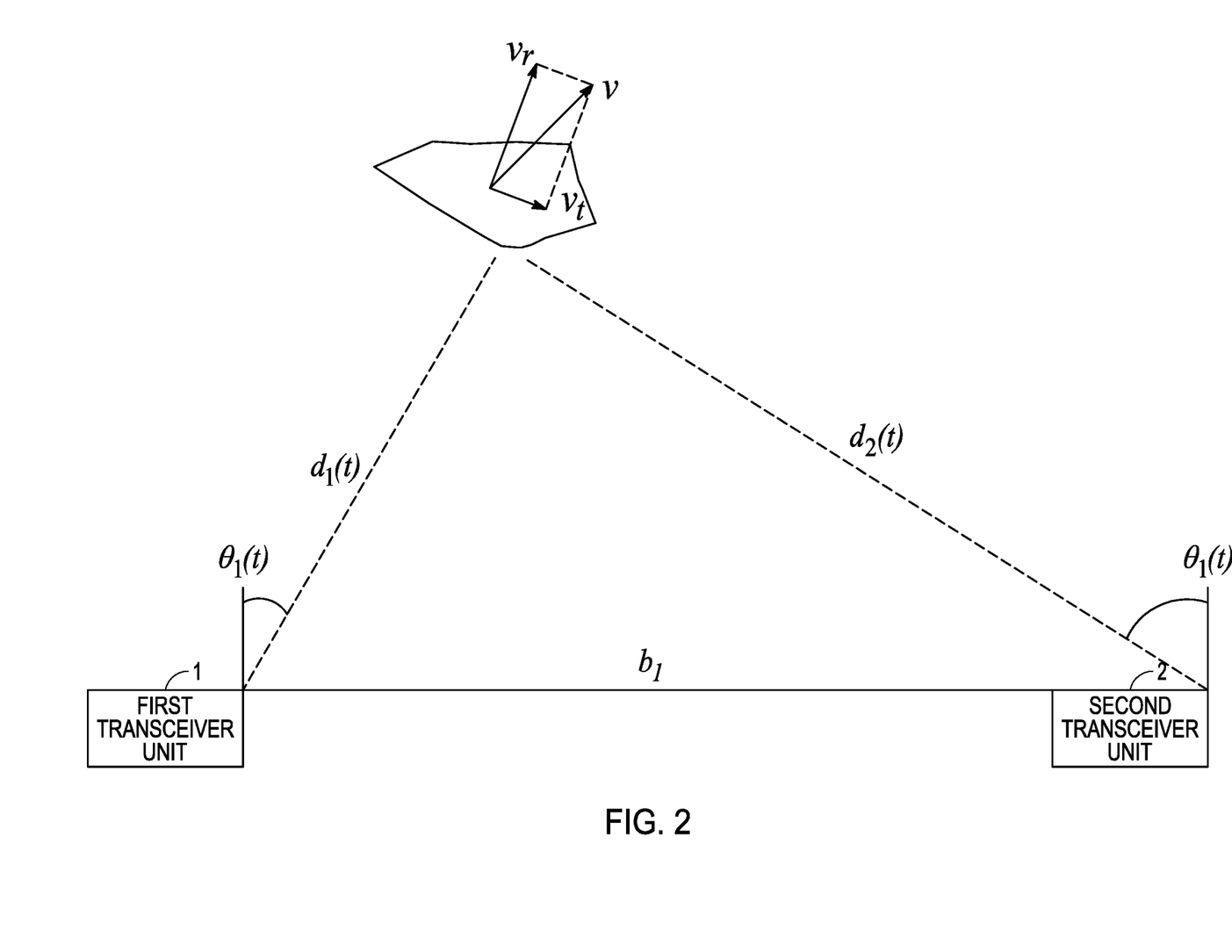
FIG. 2 shows two receiver units in a configuration deviating from FIG. 1.

At least two coarsely-synchronized radar units (transceiver units) are presumed. The distance between the units is $b_1$ (see FIG. 2; FIG. 2 shows two transceiver units at a distance of $b_1$ in relation to one another, which measure approximately simultaneously in relation to the target according to the FMCW range-Doppler principle). Both radar units are quasi-monostatic (respective distance between Rx and Tx$\ll b_1$). For the distance to the target $d_0$, $d_0 \gg b_1$ does not necessarily apply, i.e., the target can be located in the near field.

The signal model according to the FMCW range Doppler measurement principle may be expressed in this case after range compression as:

$$s_1(d, t_i) = A_1 W_d(d - d_{rt,0,1}) \cdot \exp\left(j\frac{2\pi}{\lambda}d_{rt,1}(t_i)\right), \quad (20)$$

$$s_2(d, t_i) = A_2 W_d(d - d_{rt,0,2}) \cdot \exp\left(j\frac{2\pi}{\lambda}d_{rt,2}(t_i)\right).$$

$d_{rt,n}(t_i)$ describes the double path distance from the radar Tx antenna to the target and back to the Rx antenna:

$$d_{rt,n}(t_i) = \|p_{Tx,n} - p_t(t_i)\| + \|p_t(t_i) - p_{Rx,n}\| \text{ with} \quad (21)$$

$$p_t(t_i) = [x_0, y_0] + [v_x, v_y]t_i.$$

In this case, $p_{Tx,n}/p_{Rx,n}$ is the 2D position of the Tx/Rx antenna from radar unit n. $p_t$ is the position of the target in 2D. $\|\cdot\|$ denotes the Euclidean norm. For $t_i=0$, $d_{rt,0,n}=d_{rt,n}(0)$ applies.

Figure 3:
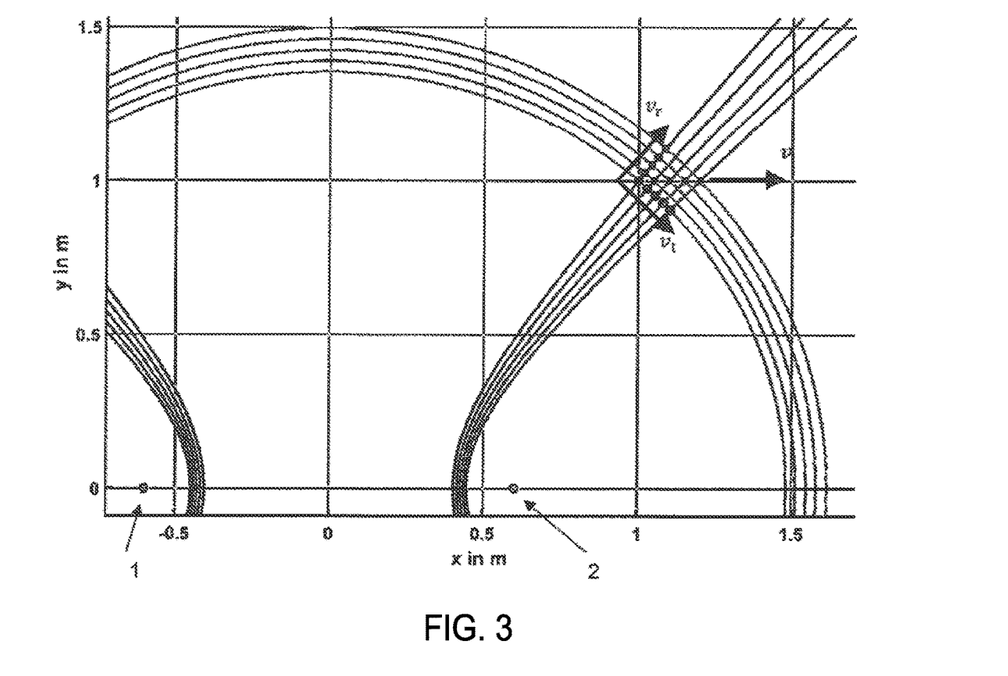
FIG. 3 shows an illustration of the movement of a target in the near field.

FIG. 1 shows an illustration of the movement of a target in the near field of a 2-radar unit assembly as a movement along ellipses/hyperbolas. It is apparent from the geometry in FIG. 3 that the position of the target can be determined by the intersection of an ellipse and a hyperbola with both radars in the focal points. The ellipse is described by the parameters $$a_g = \frac{0.5(d_{rt,2} + d_{rt,1})}{2} \quad (22)$$

and the hyperbola by $$a_H = \frac{0.5(d_{rt,2} - d_{rt,1})}{2} \quad (23)$$

The ellipse/hyperbola equations resulting therefrom are Ellipse:

$$\text{Ellipse: } \frac{x^2}{a_E^2} + \frac{y^2}{b_E^2} = 1 \text{ with:} \quad (24)$$

$$b_E^2 = a_E^2 - c_{HE}^2 \text{ and } c_{HE} = \frac{b_1}{2};$$

hyperbola:

$$\frac{x^2}{a_H^2} - \frac{y^2}{b_H^2} = 1 \text{ with } b_H^2 = c_{HE}^2 - a_H^2. \quad (25)$$

The intersection of the ellipse with the hyperbola $[x_0, y_0]$ is (strictly speaking there are two intersections; one thereof may be selected easily by plausibility considerations, however—the other is located behind the radar units)

$$x_0 = -\frac{a_E a_H}{c_{HE}}, \quad (26)$$

$$y_0 = \frac{\sqrt{-c_{HE}^4 + (a_H^2 + a_E^2)c_{HE}^2 - a_E^2 a_H^2}}{c_{HE}}$$

For a moving target, one obtains $x=x_0+v_x t_i$ and $y=y_0+v_y t_i$ and therefore $a_E(t_i)$ and $a_H(t_i)$ (these linear equations apply for the case $\|v\|T \ll d_{rt}$, wherein T is the FMCW ramp duration).

A direct interference of both signals is possibly not possible here, since $d_{rt,0,1} \neq d_{rt,0,2}$ ("range migration"). Instead, a holographic interference approach is preferably followed:

$$\begin{aligned}s_\Delta(x_{hyp}, y_{hyp}, t_i) &= A_1 s_1(d_{1,hyp}(x_{hyp}, y_{hyp}), t_i)^* \cdot \\ &\quad A_2 s_2(d_{2,hyp}(x_{hyp}, y_{hyp}), t_i) \\ &= A_{12} W_{xy}(x - x_0, y - y_0) \cdot \\ &\quad \exp\left(j\frac{2\pi}{\lambda}(d_{rt,2}(t_i) - d_{rt,1}(t_i))\right) \\ &= A_{12} W_{xy}(x - x_0, y - y_0) \cdot \\ &\quad \exp\left(j\frac{2\pi}{\lambda}4a_H(t_i)\right),\end{aligned} \quad (27)$$

where $$d_{n,hyp}(x_{hyp}, y_{hyp}) = \|p_{Tx,n} - p_{t,hyp}\| + \|p_{t,hyp} - p_{Rx,n}\| \quad (28)$$

$$\text{with } p_{t,hyp} = [x_{hyp}, y_{hyp}].$$

$p_{t,hyp}$ is in this case a hypothesis for the target position in 2D. If both signals are interfered without the complex conjugation, one obtains $$\begin{aligned}s_\Sigma(x_{hyp}, y_{hyp}, t_i) &= A_1 s_1(d_{1,hyp}(x_{hyp}, y_{hyp}), t_i) \cdot \\ &\quad A_2 s_2(d_{2,hyp}(x_{hyp}, y_{hyp}), t_i) \\ &= A_{12} W_{xy}(x - x_0, y - y_0) \cdot \\ &\quad \exp\left(j\frac{2\pi}{\lambda}(d_{rt,2}(t_i) - d_{rt,1}(t_i))\right) \\ &= A_{12} W_{xy}(x - x_0, y - y_0) \cdot \\ &\quad \exp\left(j\frac{2\pi}{\lambda}4a_E(t_i)\right).\end{aligned} \quad (29)$$

The target movement may therefore be interpreted as a movement $a_E(t_i)$ of ellipse on ellipse along a hyperbola corresponding to a radial velocity and as a movement $a_H(t_i)$ perpendicular thereto of hyperbola on hyperbola along an ellipse corresponding to a tangential velocity (cf. FIG. 3).

A following Fourier transform along $t_i$ results in $$s_\Delta(x_{hyp}, y_{hyp}, \omega_\Delta) = \mathcal{F}\{s_\Delta(x_{hyp}, y_{hyp}, t_i), t_i\} \quad (30)$$
$$= A_{12} W_{xy}(x - x_0, y - y_0) \cdot$$
$$W_\Delta\left(\omega_\Delta - \frac{2\pi}{\lambda} 4 \frac{da_H(t_i)}{dt_i}\right) \cdot$$
$$\exp\left(j \frac{4\pi}{\lambda} (d_{rt,0,2} - d_{rt,0,1})\right),$$

$$s_\Sigma(x_{hyp}, y_{hyp}, \omega_\Sigma) = \mathcal{F}\{s_\Sigma(x_{hyp}, y_{hyp}, t_i), t_i\} \quad (31)$$
$$= A_{12} W_{xy}(x - x_0, y - y_0) \cdot$$
$$W_\Sigma\left(\omega_\Sigma - \frac{2\pi}{\lambda} 4 \frac{da_E(t_i)}{dt_i}\right) \cdot$$
$$\exp\left(j \frac{4\pi}{\lambda} (d_{rt,0,2} - d_{rt,0,1})\right).$$

Figure 4:
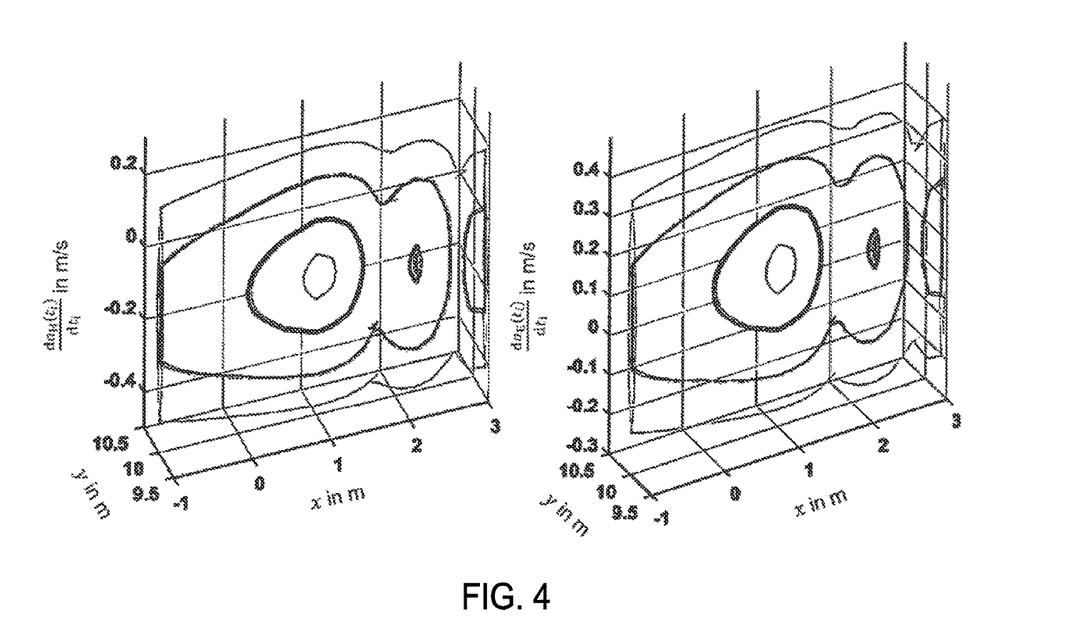
FIG. 4 shows resulting 3D spectra to estimate a velocity.

The result of this transformation is illustrated in FIG. 4. FIG. 4 shows a resulting 3D spectrum for estimating the tangential/radial velocity with given x and y. Both spectra have the same shape, but are located at different points along the z axis.

A maximum search along the $\omega_\Delta$ or $\omega_\Sigma$ direction, respectively, in the resulting 3D spectrum supplies $$\frac{da_E(t_i)}{dt_i} = \frac{\lambda}{8\pi} \omega_{\Sigma,max} \text{ and } \frac{da_H(t_i)}{dt_i} = \frac{\lambda}{8\pi} \omega_{\Delta,max}, \quad (32)$$

With the aid of the partial derivative of (26) and (32), components of the velocity vector may be computed as $$v_{r,x} = \frac{\partial x}{\partial a_E} \frac{da_E(t_i)}{dt_i} \quad (33)$$
$$v_{r,y} = \frac{\partial y}{\partial a_E} \frac{da_E(t_i)}{dt_i};$$
$$v_{t,x} = \frac{\partial x}{\partial a_H} \frac{da_H(t_i)}{dt_i}$$
and
$$v_{t,y} = \frac{\partial y}{\partial a_H} \frac{da_H(t_i)}{dt_i}.$$

The velocity vector in Cartesian coordinates is then $$v_x = v_{r,x} + v_{t,x},$$
$$v_y = v_{r,y} + v_{t,y}. \quad (34)$$

Obtaining the Uniqueness Range

The phase addition in (29) results in doubling of the measured Doppler frequency, which results in halving of the unique measurement range. This may preferably be avoided by halving the signal frequency before the interference formation. For a generic signal in analytic form $s(t) = A \exp(j\varphi(t))$, this may be expressed as $$s_{f/2} = A \exp\left(j \cdot \text{unwrap}\left(\frac{\phi(t)}{2}\right)\right). \quad (35)$$

(Frequency scaling property of the Fourier transform). The uniqueness range may thus be at least substantially completely obtained in the Doppler direction.

Compensation of Doppler Shift

The Doppler shift may preferably be compensated for by determining the Doppler velocity for each target and thus correcting the distance. Alternatively, an optimum filter approach similar to [12] may be followed. The algorithms presented in this invention may then preferably be applied unchanged to the result.

High Bandwidth or High Velocity

If the radar has a high bandwidth or the target moves very rapidly, and therefore the approximation $$4\pi \frac{B}{cT} v_r t_i \approx 0$$

is no longer fulfilled, the FFT-based Doppler compression may possibly no longer be applied, since the distance to the target changes noticeably from ramp to ramp during the burst.

This case may also be covered using an optimum filter approach similar to [12]. Alternatively, the range-Doppler compression may be carried out with the aid of fractional Fourier transform (FRFT). The algorithms presented in this invention may then be applied unchanged to the result.

Side Lobe Suppression

If both radar units have two or more antennas, a range-Doppler-compressed signal may additionally be compressed in the azimuth direction with the aid of a Fourier transform or by digital beamforming algorithms (Bartlett, Capon, MUSIC, . . . ). The presented method may then be applied unchanged to the result. This results in a suppression of the side lobes in the resulting $[x, y, v_x, v_y]$ image.

Assignment of the Targets in the 3D Spectrum for Radial and Tangential Velocity in Relation to One Another If more than one target is present in a spatial resolution cell, targets may be separated from one another on the basis of the amplitude, since the signal which originates from a target has the same amplitude $A_{12}$ in both spectra but has different frequency and phase (cf. equation (30) and (31) and FIG. 4). If two or more targets having equal amplitude are present in one spatial resolution cell, a target separation can take place with the aid of a subsequent tracking algorithm.

Expansion to 3D/More than Two Radar Stations

The 3D vectorial velocity estimation of a target is possible with the aid of at least three radar units (transceiver units), which are spatially positioned. The result then results from an intersection of two pairs, which each consist of an ellipsoid and a hyperboloid.

The method may be generalized to an arbitrary number of transceiver units and radar assemblies, in particular if an optimum filter is used instead of Fourier transform processing. For this method, a hypothesis is formed for every $[x, y, z, v_x, v_y, v_z]$ combination in the search region and compared to the measurement data. For a target at the hypothetical position $p_{hyp} = [x_{hyp}, y_{hyp}, z_{hyp}]$ and the radar number n at the position $p_n$, the distance $d_n(x_{hyp}, y_{hyp}, z_{hyp})$ between radar n and target and the unity vector $v_n(x_{hyp}, y_{hyp}, z_{hyp})$ from radar to target may be computed as $$d_n(x_{hyp}, y_{hyp}, z_{hyp}) = \|p_{Tx,n} - p_{t,hyp}\|, \quad (36)$$
$$v_n(x_{hyp}, y_{hyp}, z_{hyp}) = \frac{p_{Tx,n} - p_{t,hyp}}{\|p_{Tx,n} - p_{t,hyp}\|}.$$

For the measurement signal $s_n(d,t_i)$ according to the FMCW range Doppler principal in radar n, the following optimum filter may be formulated $$a_n(x_{hyp}, y_{hyp}, z_{hyp}, v_{x,hyp}, v_{y,hyp}, v_{z,hyp}, t_i) = \quad (37)$$
$$\exp\left(-j\frac{4\pi}{\lambda}v_{r,hyp,n}(x_{hyp}, y_{hyp}, z_{hyp}, v_{x,hyp}, v_{y,hyp}, v_{z,hyp})t_i\right),$$

with the hypothesis $v_{t,hyp,n}(v_{x,hyp}, v_{y,hyp}, v_{z,hyp})$ for the radial velocity (Doppler velocity):

$$v_{r,hyp,n}(x_{hyp}, y_{hyp}, z_{hyp}, v_{x,hyp}, v_{y,hyp}, v_{z,hyp}) = \quad (38)$$
$$v_n(x_{hyp}, y_{hyp}, z_{hyp}) \cdot v_{hyp} = v_n(x_{hyp}, y_{hyp}, z_{hyp}) \cdot \begin{bmatrix} v_{x,hyp} \\ v_{y,hyp} \\ v_{z,hyp} \end{bmatrix}.$$

|•| denotes the scalar product of two vectors in this case. The result is thus computed as $$m_{r,hyp,n}(x_{hyp}, y_{hyp}, z_{hyp}, v_{x,hyp}, v_{y,hyp}, v_{z,hyp}) = \quad (39)$$
$$\sum_{n=1}^{N_{rad}} \sum_{i=1}^{N_{sw}} s_n(d(x_{hyp}, y_{hyp}, z_{hyp}), t_i)$$
$$a_n(x_{hyp}, y_{hyp}, z_{hyp}, v_{x,hyp}, v_{y,hyp}, v_{z,hyp}, t_i)$$

with the radar unit number $N_{rad}$ and FMCW sweeps number $N_{SW}$. The target position and vectorial velocity may be determined by maximum search in the resulting 4D pseudo-spectrum. A 6D spectrum is obtained for 3D problems after a similar procedure.

This method is possibly more computing-intensive than the FFT-based method presented before.

Application of the Method to a Direct Path and a Cross Path, which were Obtained According to Method I and/or II If two radars measure in relation to a target according to method I and/or II, two direct measuring paths are obtained ($d_{rt,11}=2d_1$: radar 1→target→radar 1, $d_{rt,22}=2d_2$: radar 2→target→radar 2) and two cross paths ($d_{rt,12}=d_1+d_2$: radar 1→target→radar 2, $d_{rt,21}=d_2+d_1$: radar 2→target→radar 1) are obtained. Since method I and/or II enables the phase-coherent analysis of the cross paths. they may also be processed to estimate the vectorial velocity according to the described method.

If the hyperbola and ellipse parameters from equations (22) and (23) are expressed by $d_{rt,11}$ and $d_{rt,21}$, one obtains:

$$a_E = \frac{d_{rt,21}}{2} = \frac{d_2 + d_1}{2} \quad (40)$$

and $$a_H = \frac{d_{rt,21} - d_{rt,11}}{2} = \frac{d_2 - d_1}{2}. \quad (41)$$

The method may therefore also be applied unchanged to a combination of a direct path and a cross path. This has the advantage that one sees targets which are visible in the cross path and in a direct path, but not in both direct paths.

Figure 5:
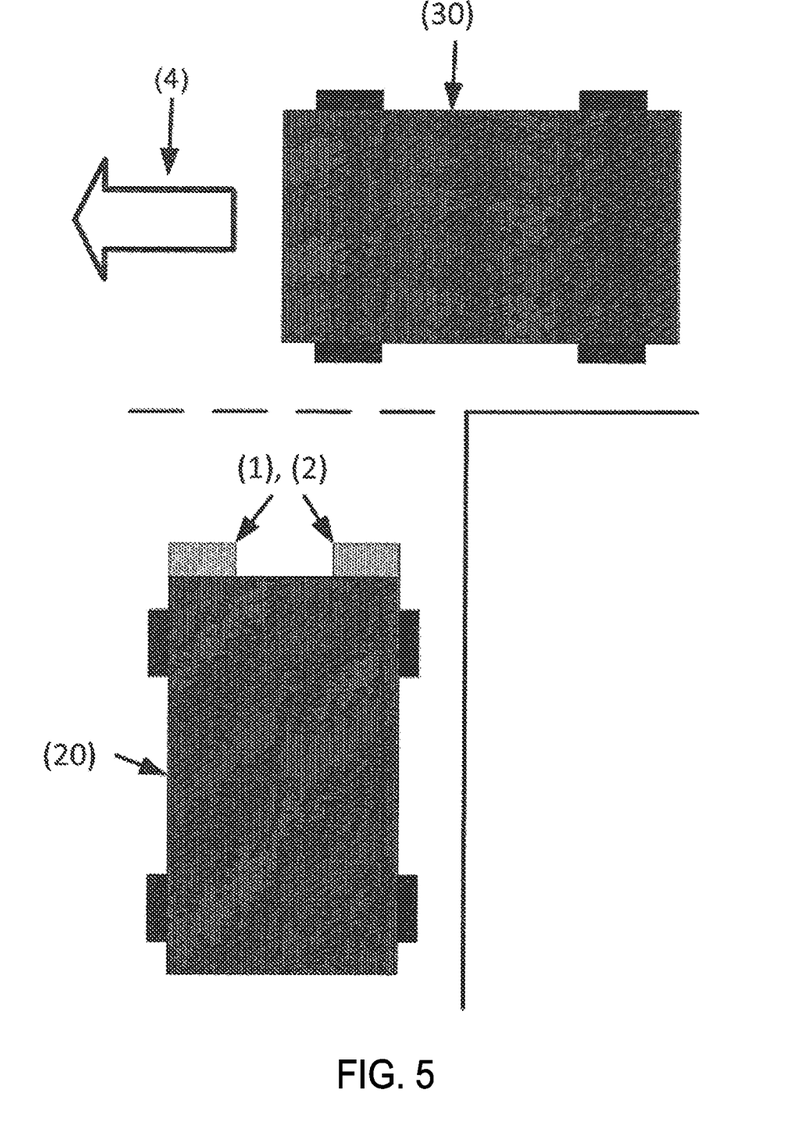
FIG. 5 shows a measuring situation having two passenger automobiles.

Application Examples of the Vectorial Velocity Estimation According to the Proposed Method FIG. 5 shows an application in the automotive field having an automobile (20), equipped with two radars (1), (2), which are triggered approximately simultaneously by a signal. A further automobile (30) drives in the direction of the arrow (4).

The automobile (20) can wait at an intersection or drive toward the intersection, for example. The distance and the angle in relation to the automobile (30) can be determined using standard processing of the radar data at automobile (20). Furthermore, the relative radial velocity can be determined. Since in this case the automobile (30) moves approximately tangentially in relation to the connecting axis between radar (1), (2) and target, i.e., automobile (30), the Doppler frequency would be ≈0 Hz. The measured radial velocity would therefore be ≈0 m/s. It thus may not be determined whether the automobile (30) travels or is stationary. Using the method proposed according to the invention, the signals of the radar stations (1), (2) can be coherently processed, although they are not (phase-)synchronized, and the (complete) vectorial velocity of the automobile (30) can be determined therefrom. This information can be fused with further algorithms for registering the surroundings, which is advantageous for driver assistance systems and autonomous driving. With the aid of this method, possibly in combination with already provided methods, an amplitude (power), a velocity, and a movement direction can be associated with every point from the radar image.

Figure 6:
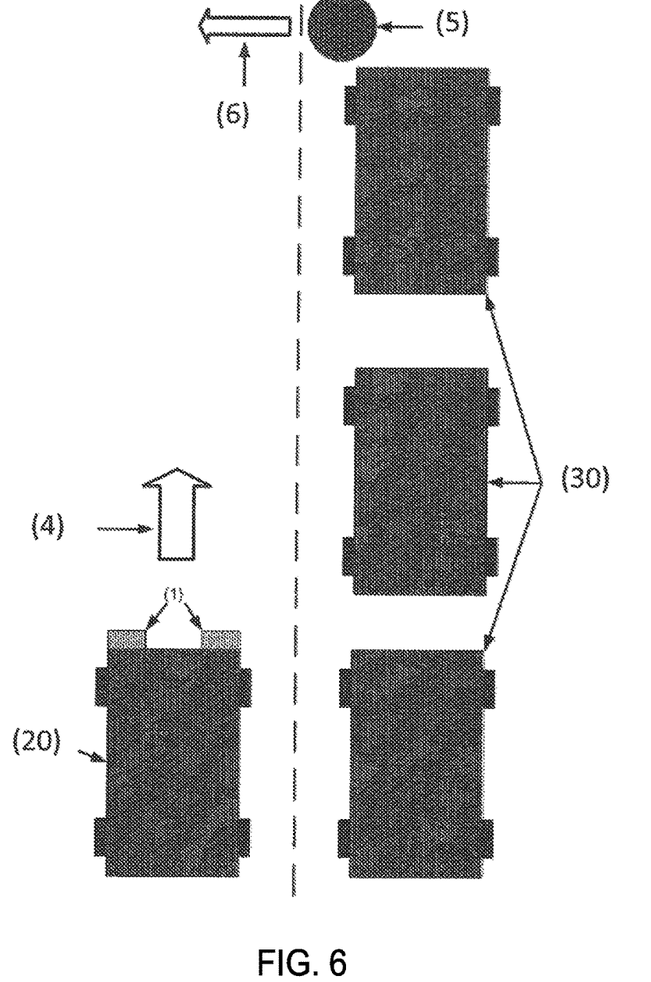
FIG. 6 shows a measuring situation having four passenger automobiles and a pedestrian.

FIG. 6 shows a further application with an automobile (20), equipped with two radars (1), (2), which are triggered approximately simultaneously by a signal, wherein the automobile travels in the direction of the arrow (4). Parked automobiles (30) are present on the edge of the road. A pedestrian (5) walks on the roadway in the direction of the arrow (6).

If the automobile (20) moves in the direction of the arrow (4) and parked automobiles (30) are present on the edge of the road, the automobile (20) would not recognize the pedestrian (5) who moves in the direction of the arrow (6) until the last moment, since he would be concealed by the parked autos. An additional measurement of the tangential velocity, as soon as the pedestrian can be seen by the radar, can enable a more rapid reaction and possibly prevent an accident.

Overall, the present invention in particular also comprises a particularly accurate estimation of the (2D or 3D) vectorial velocity of objects (targets). For this purpose, at least two (spatially separated) FMCW radars can be provided, which in particular measure according to the range-Doppler principal. These FMCW radars are preferably only coarsely time-synchronized. Both stations can be triggered (approximately) simultaneously and transmit and receive FMCW bursts (having a known frequency offset in relation to one another). The complete vectorial velocity of the objects (targets) in the surroundings can then be estimated from an interference of resulting (baseband) signals.

Figure 7:
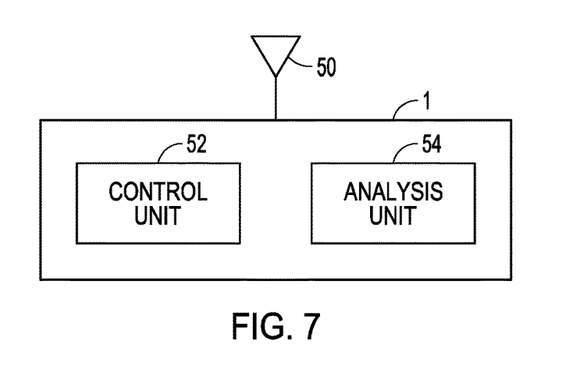
FIG. 7 shows an example of a first transceiver unit that can implement various techniques of this disclosure.

FIG. 7 shows an example of a first transceiver unit that can implement various techniques of this disclosure. The first transceiver unit 1 can include at least one antenna 50, a control unit 52 and an analysis unit 54.

It is to be noted at this point that all above-described parts and/or functions are claimed is essential to the invention considered alone and in any combination, in particular the details illustrated in the drawings. Modifications thereof are routine for a person skilled in the art.

What is claimed is:

1. A radar method for determining at least one of an angular position, a location, or a velocity of a target, the method comprising:
triggering, in a wireless or wired manner, a measurement in a first transceiver unit and at least one second transceiver unit, wherein a start time of the measurement of the first transceiver unit and a start time of the measurement of the least one second transceiver unit are separated by a chronological deviation $\Delta t_n$, wherein the first transceiver unit is spatially separated from the at least one second transceiver unit, and wherein the first transceiver unit and the least one second transceiver unit are not synchronized;
coherently processing measurements of the transceiver units;
receiving at least two measurement signals reflected from the target;
performing a complex conjugated multiplication of representations of the at least two measurement signals; and
determining a vectorial velocity of the target.

2. The method according to claim 1, comprising:
determining a location of the target using a holographic interference technique.

3. The method according to claim 1, wherein the first transceiver unit and the least one second transceiver unit are FMCW radars.

4. The method according to claim 1, comprising:
halving a signal frequency before an interference formation, wherein the interference formation includes either multiplying representations of the signals reflected from the target or convolving the representations of the signals reflected from the target.

5. The method according to claim 1, wherein at least three transceiver units are used, the method comprising:
performing a 3D velocity determination by forming an intersection of two pairs, which each consist of an ellipsoid and a hyperboloid, and/or
applying a filter, wherein a hypothesis is formed for multiple or all [x, y, z, $v_x$, $v_y$, $v_z$] combinations in a search region and is compared to measurement data.

6. The method according to claim 1, comprising:
in the first transceiver unit, generating and transmitting a first signal via a first path,
in the at least one second transceiver unit, generating and transmitting a further first signal via the first path,
forming a first comparison signal from the first signal of the first transceiver unit and from such a first signal from the at least one second transceiver unit received via the first path, and
forming a second comparison signal from the first signal of the at least one second transceiver unit and from such a first signal from the first transceiver unit received via the first path,
wherein the second comparison signal is transmitted from the at least one second transceiver unit to the first transceiver unit, and/or
wherein a comparison-comparison signal is formed from the first comparison signal and the second comparison signal, and/or
wherein in a first step, compensating for differences between the first and second comparison signals that result from differences between the first transceiver unit and the at least one second transceiver unit and,
wherein in a second step, at least one complex value from the first comparison signal or from a signal that was derived from the first comparison signal is used for the purpose of adapting at least one complex value of the second comparison signal or a value of a signal that was derived from the second comparison signal and thus to form an adapted signal, wherein the adaptation takes place such that a vectorial sum or a difference of the complex values is formed or a sum or a difference of phases of the complex values is formed.

7. The method according to claim 1, comprising:
generating at least two range-Doppler-compressed signals from signals reflected from the target; and
convolving the at least two range-Doppler-compressed signals.

8. The method according to claim 1, comprising:
performing a holographic interference in the x-y direction of signals reflected from the target; and
performing an interference along a velocity plane by either multiplying representations of the signals reflected from the target or convolving the representations of the signals reflected from the target.

9. The method according to claim 8, comprising:
performing a Fourier transform carried out along a slow time, and/or
performing a peak search to determine an ellipse/hyperbola velocity in at least multiple pixels of the target, and/or
determining ellipse/hyperbola parameters in at least multiple pixels of the target, and/or
performing a transformation of the ellipse/hyperbola velocity into a vectorial velocity in a Cartesian coordinate system.

10. The method according to claim 1, comprising:
determining a Doppler velocity for at least partial compensation of a Doppler shift.

11. The method according to claim 1, comprising:
applying a filter for at least partial compensation of a Doppler shift and/or in the event of a high bandwidth of the radar and/or a high velocity of the target.

12. The method according to claim 1, comprising:
performing a range-Doppler compression using a fractional Fourier transform (FRFT).

13. The method according to claim 1, comprising:
compressing, in the azimuth direction, one or more range-Doppler-compressed signals for side lobe suppression.

14. The method according to claim 1, wherein the target is located in a far field of an aperture formed by the first transceiver unit and the least one second transceiver unit.

15. A radar system for determining at least one of an angular position, a location, or a velocity of a target, the radar system comprising:
a first transceiver unit and at least one second transceiver unit, wherein the first transceiver unit is spatially separated from the at least one second transceiver unit, wherein the first transceiver unit and the least one second transceiver unit are not synchronized;
a control unit configured to trigger, in a wireless or wired manner, a measurement in the first transceiver unit and the at least one second transceiver unit, wherein a start time of the measurement of the first transceiver unit and a start time of the measurement of the least one second transceiver unit are separated by a chronological deviation $\Delta t_n$; and
an analysis unit configured to:
coherently process measurements of the first transceiver unit and the least one second transceiver unit;

perform a complex conjugated multiplication of representations of the measurements of the first transceiver unit and the least one second transceiver unit; and determine a vectorial velocity of the target.

16. The radar system according to claim 15, wherein the target is located in a near field of an aperture formed by the first transceiver unit and the least one second transceiver unit.

17. The radar system according to claim 15, wherein the target is located in a far field of an aperture formed by the first transceiver unit and the least one second transceiver unit.

18. The radar system according to claim 15, wherein the first transceiver unit and the least one second transceiver unit form a distributed aperture.

19. The radar system according to claim 15, wherein the first transceiver unit and the least one second transceiver unit are monostatic.

20. A vehicle comprising:
a radar system for determining at least one of an angular position, a location, or a velocity of a target, the radar system comprising:
a first transceiver unit and at least one second transceiver unit, wherein the first transceiver unit is spatially separated from the at least one second transceiver unit, and wherein the first transceiver unit and the least one second transceiver unit are not synchronized;
a control unit configured to trigger, in a wireless or wired manner, a measurement in the first transceiver unit and the at least one second transceiver unit, wherein a start time of the measurement of the first transceiver unit and a start time of the measurement of the least one second transceiver unit are separated by a chronological deviation $\Delta t_n$; and
an analysis unit configured to:
coherently process measurements of the first transceiver unit and the least one second transceiver unit;
perform a complex conjugated multiplication of representations of the measurement in the first transceiver unit and the at least one second transceiver unit; and
determine a vectorial velocity of the target.

21. The vehicle according to claim 20, wherein the first transceiver unit and the least one second transceiver unit form a distributed aperture.

22. The vehicle according to claim 20, wherein the first transceiver unit and the least one second transceiver unit are monostatic.

* * * * *